(No Model.) 2 Sheets—Sheet 2.

D. B. WESSON.
VEHICLE WHEEL.

No. 438,334. Patented Oct. 14, 1890.

Witnesses:

Inventor:
Daniel B Wesson
by Chapin
Atty's

UNITED STATES PATENT OFFICE.

DANIEL B. WESSON, OF SPRINGFIELD, MASSACHUSETTS.

VEHICLE-WHEEL.

SPECIFICATION forming part of Letters Patent No. 438,334, dated October 14, 1890.

Application filed July 5, 1890. Serial No. 357,902. (No model.)

*To all whom it may concern:*

Be it known that I, DANIEL B. WESSON, a citizen of the United States, residing at Springfield, in the county of Hampden and State of Massachusetts, have invented new and useful Improvements in Wheels for Vehicles, of which the following is a specification.

This invention relates to wheels for vehicles, and more particularly to those for bicycles, velocipedes, &c., the object being to provide a vehicle-wheel of improved construction as regards the felly and the rim or tire thereof, whereby a wheel is produced having a yielding or spring tire; and the invention consists in the peculiar construction and arrangement of the felly and tire of the wheel and intermediately-operating spring devices, all as hereinafter fully described, and pointed out in the claims.

Figure 1:
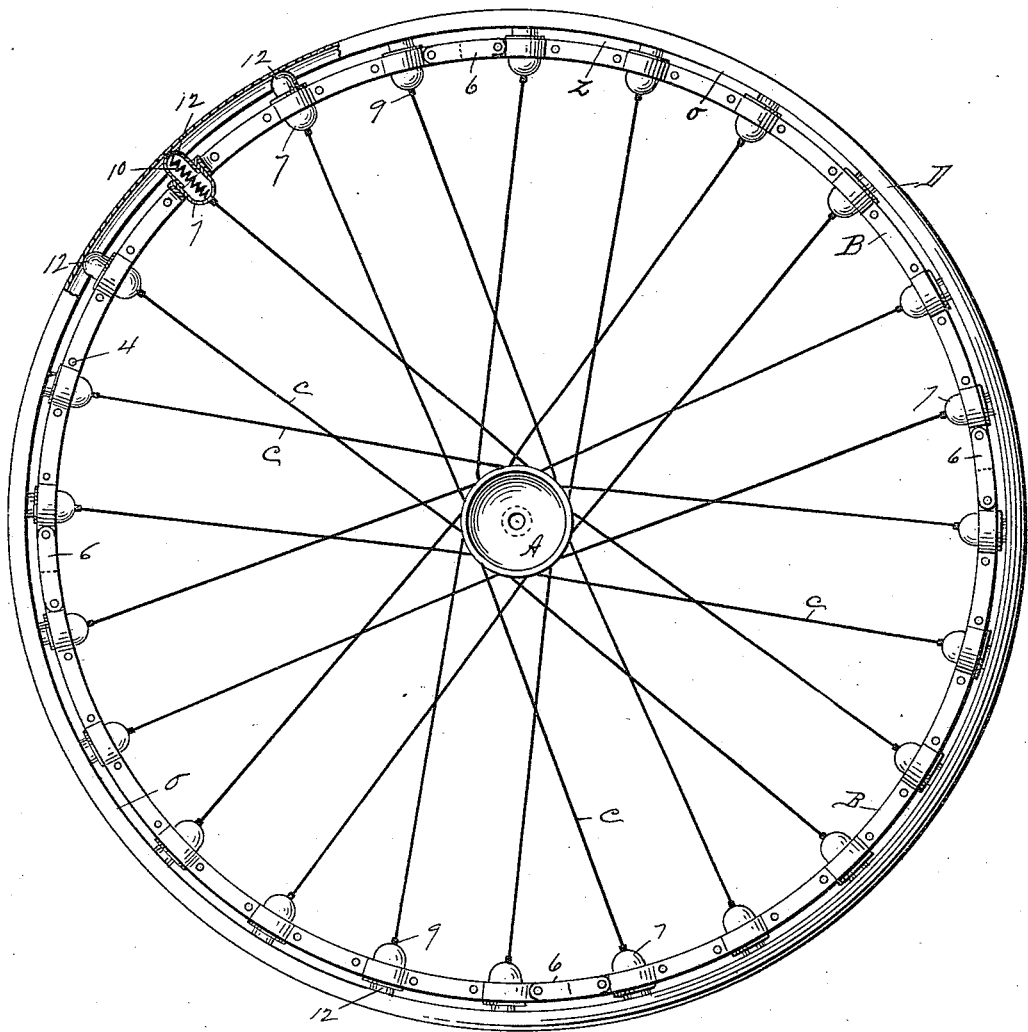
Figure 2:
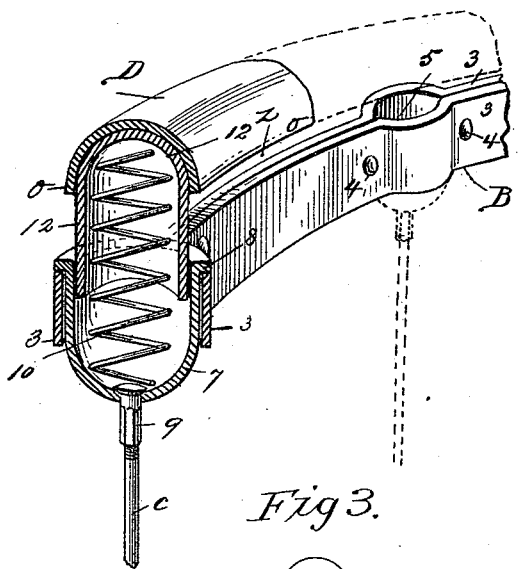
Figure 3:
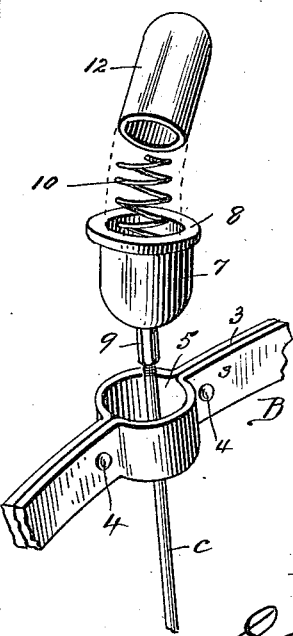

In the drawings forming part of this specification, Figure 1 is a side elevation of a vehicle-wheel, partly in section and having a portion of the tire broken away, constructed according to my invention. Fig. 2 is a perspective view showing a section of the felly and the tire of the wheel and other detail parts thereof, hereinafter fully described. Fig. 3 is a perspective view illustrating a section of the felly and detail parts of the wheel, which are fully described below.

In the drawings, A is the hub of the wheel, of any ordinary suitable metallic construction, and *c* are the spokes of the wheel, preferably of metallic construction and in the form of cylindrical rods, the inner ends of which are rigidly connected to the hub in any suitable manner.

B indicates the felly of the wheel, consisting of two metallic strips 3 3, (see Figs. 2 and 3,) said strips being secured side by side by rivets 4, passing therethrough, or by other similar suitable means, and having formed therebetween a series of circular openings or sockets 5. The preferable way of constructing said felly is to make each of the strips 3, with its requisite half-round portions therein, which constitute the sides of said openings, and bend said strip to the proper circular form, and then secure said strips side by side, as shown, and finally unite the ends thereof by securing a metal strap or straps 6 on one or both sides of the said ends by rivets or screws passing therethrough; or the ends of the felly may be united by welding or brazing. The said openings 5 through the felly consist of a number corresponding to that of the number of spokes in the wheel, and into each of said openings or sockets 5 is placed a metallic cup 7, preferably of light sheet-metal construction, having a laterally-projecting rim 8 thereon, which bears on the outer edge of the felly on the border of the opening 5. The bottom of said cup 7 is perforated to allow of passing therethrough the end of a tubular nut 9, having a head thereon, as shown in Fig. 2, which engages with the inner side of the bottom of said cup, said nut 9 having a screw engagement with the outer end of the spoke *c*, whereby the requisite tensile strain is imparted to each spoke and the cup is drawn toward the hub of the wheel and tightly against the felly, thereby putting the requisite strain upon the wheel between the hub A and the felly. In each of said cups 7 is placed a spiral spring 10 of a length considerably in excess of the depth of said cup 7, and over said spring is placed a second cup 12, whose open end enters the said cup 7, as clearly shown in Figs. 1 and 2. Thus the said cup 12 has a telescopic connection with said cup 7, and is adapted to have a movement into said latter-named cup against the resistance of said spring 10 and to be thrown outwardly from said cup 7 by the reaction of said spring.

A tire D for the within-described wheel is made, preferably, from sheet-steel in the form clearly shown in Fig. 2—that is to say, its outward portion is substantially semicircular in cross-section and conforms to the curvature of the outer ends of said cups 12, and is adapted to have its bearing solely thereon. The borders *o* of said tire extend toward the felly B; but care is taken that there shall be left an opening *z* between the felly B and the tire D all around the wheel, said opening being continuous, excepting where it is interrupted by the said cups 12. The purpose of said opening *z* or clear space between the felly and tire is to prevent the accumulation of dirt therebetween, it being obvious that if any should temporarily lodge there it would almost immediately be shaken out by reason of the rotation of the wheel and the constant movement of the tire toward and from the felly under the action of the load on the wheel and of said springs. Said tire D is made continuous for the whole of its circumference, and is produced, preferably, by drawing a strip of metal through properly-shaped dies to give it the proper form, (or by other suitable means,) and then bending it to circular form and brazing the meeting ends thereof. The said cups 12 are thrown outward to their normal positions, as shown in Figs. 1 and 2, and held against the tire D by the action of the springs 10 therein, and a pressure upon the wheel-tire forces the latter against the ends of certain of said cups 12, forcing them endwise into the cups 7 and against the springs 10, the latter reacting as soon as the pressure upon that part of the tire ceases and throwing the tire from the felly.

In practice the force of the springs 10 is so graduated to the load which the wheel is to support that the maximum load will not so far move the tire toward the felly as to bring the borders of the tire to a line with the outer edge of the latter, and thereby the tire is constantly held in suspension on said spring-actuated cups 12, and the latter have such a firm engagement with the cups 7 in the felly that they provide ample support against any lateral movement of the tire relative to the felly.

The wheel thus constructed comprises mechanism, as described, whereby that portion of the tire which bears upon the ground and upon which the weight of the load acts is spring-supported, for it acts constantly against certain of the springs 10, which are contained within the said cups of the felly B. By this construction a wheel having a yielding or spring tire is provided, which renders the vehicle on which the wheel may be used an easy-riding one and entirely free from the constant shocks and vibrations pertaining to a wheel having either a tire rigid upon the felly or an ordinary rubber tire secured to the rim or felly of a wheel in the usual manner of constructing the wheels of bicycles and similar vehicles.

What I claim as my invention is—

1. A vehicle-wheel having a felly provided with a series of cup-sockets therein, a pair of cups in each of said sockets, one cup having a fixed engagement with the felly and with one of the spokes of the wheel, and the other having a telescopic movement within said first-named cup, a spring within said cups acting to move one thereof outwardly, and a tire encircling said felly and cups and engaged by said movable cups, combined and operating substantially as set forth.

2. A vehicle-wheel having spoke-connections with the tire thereof, consisting of cups placed in sockets in said tire, having rims thereon engaging with the outer edge of said tire, and headed tubular nuts engaging the bottom of said cups and the outer ends of the wheel-spokes, combined with springs inserted in said cups, other cups receiving the outer ends of said springs and having spring-restrained telescopic movements within said first-named cups, and a tire encircling said felly and engaged by said telescopically-moving cups, substantially as set forth.

3. A vehicle wheel having a felly in which is formed a series of cup-sockets, a cup resting in each of said sockets, having its open end outward, a cup having its open end entering each of said first-named cups, and having a telescopic movement therein, a spring interposed between each pair of said cups, and a tire encircling said cups and engaged by said telescopically-moving ones, combined and operating substantially as set forth.

DANIEL B. WESSON.

Witnesses:
H. A. CHAPIN,
WM. S. BELLOWS.